(12) United States Patent
Smith (10) Patent No.: US 7,996,366 B1
(45) Date of Patent: Aug. 9, 2011

(54) METHOD AND SYSTEM FOR IDENTIFYING STALE DIRECTORIES

(75) Inventor: Carl T. Smith, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 312 days.

(21) Appl. No.: 11/248,414

(22) Filed: Oct. 13, 2005

(51) Int. Cl.
*G06F 17/00* (2006.01)
*G06F 12/00* (2006.01)
*G06F 13/28* (2006.01)

(52) U.S. Cl. ......... 707/662; 707/666; 707/829; 711/160
(58) Field of Classification Search .................. 707/100, 707/200, 662, 666, 829; 705/1; 711/100, 711/134, 160; 715/200–277; 709/203
See application file for complete search history.

(56) References Cited

U.S. PATENT DOCUMENTS

| | | | | |
|---|---|---|---|---|
| 5,113,519 A * | 5/1992 | Johnson et al. | ................ | 707/201 |
| 5,442,771 A * | 8/1995 | Filepp et al. | ................ | 709/219 |
| 5,666,532 A * | 9/1997 | Saks et al. | ................ | 707/613 |
| 6,519,612 B1 * | 2/2003 | Howard et al. | ................ | 707/200 |
| 7,039,642 B1 * | 5/2006 | Horvitz et al. | ................ | 707/100 |
| 7,783,602 B2 * | 8/2010 | Iyengar et al. | ................ | 707/638 |
| 2002/0032691 A1 * | 3/2002 | Rabii et al. | ................ | 707/200 |
| 2002/0078304 A1 * | 6/2002 | Masri et al. | ................ | 711/134 |
| 2004/0128345 A1 * | 7/2004 | Robinson et al. | ................ | 709/203 |
| 2005/0278278 A1 * | 12/2005 | Petev et al. | ................ | 707/1 |
| 2006/0288043 A1 * | 12/2006 | Novak et al. | ................ | 707/104.1 |

OTHER PUBLICATIONS

UNIX ON-LINE Man Pages, http://bama.ua.edu/cgi-bin/man-cgi, University of Alabama, 1994.*

* cited by examiner

*Primary Examiner* — Vincent Boccio
*Assistant Examiner* — Bao Tran
(74) *Attorney, Agent, or Firm* — Rosenberg, Klein & Lee (57) ABSTRACT

Aspects for identifying stale contents in a file system include processing a set of attributes of each file in the file system. These aspects further also include determining access times at the directory level, recursively, from all the files in lower-level directories. The aspects further include identifying the highest-level stale directories in the file system.

17 Claims, 13 Drawing Sheets

SRM Reports for srclink

Up: SRM Reports

| Mountpoint | Owner Dept Filesystem | Allocated | srUsed | Avail | # Files | Total Size | # Stale Dirs | # Stale Files | Stale Size KB | % Stale |
|---|---|---|---|---|---|---|---|---|---|---|
| /export/srclink/vol11 | nasa-v004:/export/srclink/vol11 | 15,728,640 | 11,158,731 | 4,293,762 | 406,920 | 11,006,509 | 180 | 406,649 | 10,991,005 | 99 |
| /export/srclink/vol12 | nasa-v004:/export/srclink/vol12 | 8,388,608 | 161,788 | 7,741,594 | 4,577 | 112,816 | 52 | 2,271 | 34,125 | 30 |
| /export/srclink/vol13 | nasa-v004:/export/srclink/vol13 | 36,700,160 | 9,920,176 | 25,106,281 | 308,445 | 9,800,953 | 2 | 308,445 | 9,800,953 | 100 |
| /export/srclink/vol14 | nasa-v004:/export/srclink/vol14 | 31,457,280 | 10,294,568 | 19,840,104 | 379,160 | 10,156,287 | 8 | 379,160 | 10,156,287 | 100 |
| /export/srclink/vol15 | nasa-v004:/export/srclink/vol15 | 36,700,160 | 23,914,447 | 12,000,282 | 701,479 | 23,662,271 | 4,375 | 510,077 | 11,493,768 | 48 |
| /export/srclink/vol16 | nasa-v004:/export/srclink/vol16 | 26,214,400 | 19,204,043 | 6,572,251 | 582,697 | 19,003,495 | 5,085 | 338,880 | 8,729,554 | 45 |
| /export/srclink/vol17 | nasa-v004:/export/srclink/vol17 | 8,388,608 | 18,516 | 7,846,968 | 1 | 0 | 0 | 0 | 0 | 0 |
| Total | | 163,577,856 | 74,672,269 | 83,401,242 | 2,383,279 | 73,742,331 | 9,702 | 1,945,482 | 51,205,692 | 69 |

FIG. 7

SRM Report for srclink/export.srclink.vol12

Up: SRM Reports for srclink

| Top Level Entries | User | Storage By Group | Stale Directories | Report Text |

802 — Top Level Entries
804 — User
806 — Group
808 — Stale Directories

Date collected on Tue, May 10 @ 12:26pm PDT

| Filesystem | Allocated KB | Used | Avail | Cap | Mountpoint |
|---|---|---|---|---|---|
| /dev/vx/dsk/fs04/srclink_vol12 | 8,388,608 | 161,788 | 7,741,594 | 3% | /export/srclink/vol12 |

| | Files | KB |
|---|---|---|
| Total | 4,577 | 112,816 |

Last Access Times

| | | |
|---|---|---|
| Within 1 month: | 602 | 7,489 |
| Over 1 month: | 174 | 1,648 |
| Over 6 months: | 1,003 | 9,970 |
| Over 1 year: | 2,798 | 93,709 |

FIG. 8

Top Level Entries for srclink/export.srclink.vol12

Up: SRM Report for srclink/export.srclink.vol12

| # Files | Size in KB | Newest File | Last Access Time | Top Level Entry |
|---|---|---|---|---|
| 1,784 | 45,255 | 05/09/2005 17:48:36 | 05/09/2005 17:48:36 | pages |
| 1,801 | 29,277 | 04/15/2005 19:18:56 | 04/23/2005 12:12:53 | sourcecode |
| 1 | 18,920 | 10/31/2003 10:56:30 | 11/25/2003 06:40:49 | s.tar —— 902 |
| 291 | 10,383 | 08/16/2004 10:32:25 | 05/02/2005 20:23:00 | lib |
| 604 | 3,995 | 12/17/2004 12:04:00 | 05/02/2005 20:23:13 | configuration |
| 1 | 1,962 | 06/11/2003 12:08:55 | 11/25/2003 06:40:50 | cds12606_conf.tar |
| 20 | 1,124 | 04/15/2005 19:18:38 | 04/15/2005 18:56:27 | scripts |
| 1 | 953 | 06/11/2003 12:15:17 | 11/25/2003 06:40:50 | cds123456_conf.tar |
| 1 | 814 | 10/11/2002 17:10:00 | 11/25/2003 06:40:49 | conf12285.tar |
| 69 | 119 | 06/15/2004 11:22:00 | 09/08/2004 12:12:36 | templates |
| 4 | 14 | 02/06/2003 15:37:07 | 11/25/2003 06:41:03 | xml |

FIG. 9

Directories not accessed in over 180 days for srclink/export.srclink.vol12

Up: SRM Report for srclink/export.srclink.vol12

| # Files | Size in KB | Newest File | Last Access Time | Path |
|---|---|---|---|---|
| 2,271 | 34,125 | Total | | |
| 941 | 11,765 | 10/20/2003 10:47:53 | 11/25/2003 16:41:12 | /export/srclink/vol12/sourcecode/s_orig |
| 16 | 10,279 | 12/17/2004 11:36:52 | 05/12/2004 15:59:16 | /export/srclink/vol12/pages/en/service/VersionSync |
| 330 | 2,507 | 09/09/2003 12:55:47 | 10/11/2004 12:29:34 | /export/srclink/vol12/pages/jp_images |
| 267 | 2,099 | 10/15/2003 14:28:41 | 11/25/2003 06:41:03 | /export/srclink/vol12/configuration/s_orig |
| 186 | 1,928 | 10/11/2003 17:11:55 | 11/25/2003 16:41:01 | /export/srclink/vol12/lib/COM |
| 1 | 1,040 | 06/04/2004 11:03:05 | 06/03/2004 09:07:20 | /export/srclink/vol12/pages/en/scripts/projectcode |
| 17 | 641 | 09/12/2002 00:33:34 | 12/29/2003 17:01:01 | /export/srclink/vol12/pages/en/softwareupdate/SWUProcess081102_files |
| 41 | 599 | 11/25/2003 15:52:16 | 11/25/2003 15:52:16 | /export/srclink/vol12/lib/docs |

METHOD AND SYSTEM FOR IDENTIFYING STALE DIRECTORIES

BACKGROUND

The present invention relates to identifying stale contents in a file system.

File systems, such as in the UNIX operating system, are commonly represented as a tree structure and may contain millions of files in thousands of directories. Directories are used to group files in whatever manner is convenient to the user.

Several methods have been used for archiving or deleting stale contents in a file system to provide space for more useful contents. The word 'stale' refers to contents that have not been accessed for a period of time that is greater than a pre-defined period of time. One method to address the stale contents problem includes the creation of a list of stale files, which can be complicated in a large file system. Further, deleting every stale file in a large list may leave the file system with directories in various states, from unaffected to partially emptied to those that are completely devoid of any files. It may also leave levels upon levels of directories containing directories without any files. Re-organizing such a file system can be extremely difficult.

In light of the foregoing discussion, a need exists for a manageable manner to identify stale contents in a file system. The present invention addresses such a need.

SUMMARY

Aspects for identifying stale contents in a file system include processing a set of attributes of each file in the file system. These aspects further include determining access times at the directory level, recursively, from all the files in lower-level directories; as well as identifying the highest-level stale directories in the file system.

Through the present invention, a manageable manner of identifying stale contents as the highest-level stale directories in the file system is provided. These and other advantages will be more fully appreciated in conjunction with the following detailed description and accompanying drawings.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

DESCRIPTION OF VARIOUS EMBODIMENTS

The embodiments of the present invention relate to a method and a system for identifying stale directories in a file system. The following description is presented to enable one of ordinary skill in the art to make and use the present invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
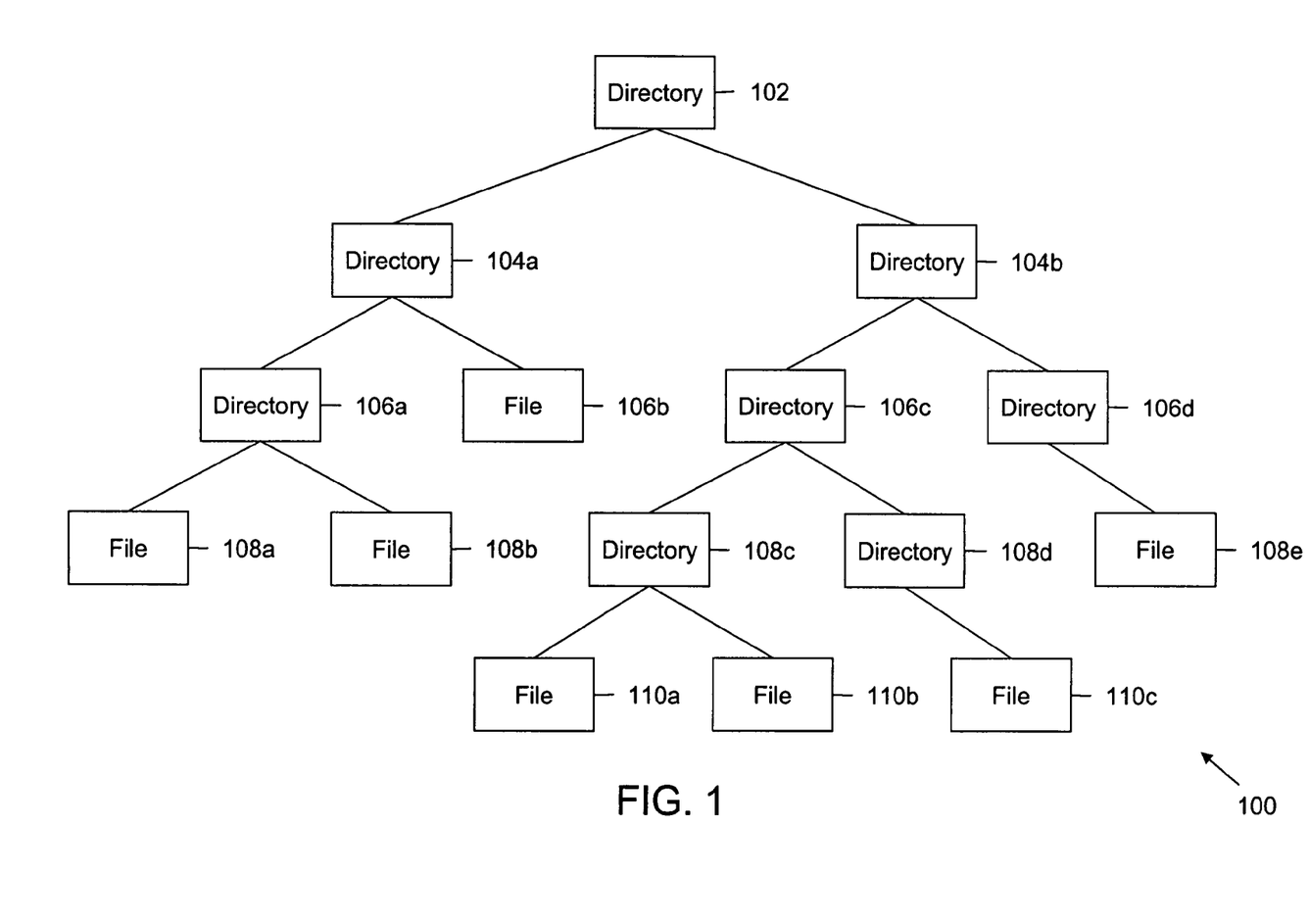
FIG. 1 illustrates an example block diagram of a file system, wherein various embodiments of the present invention can be practiced.

In accordance with various embodiments of the present invention, the file system may be represented as a tree structure, i.e., it may have various levels of directories. FIG. 1 illustrates an example block diagram of a file system 100, wherein various embodiments of the present invention can be practiced. As shown, file system 100 includes one or more levels of directories. For purposes of this disclosure, a directory is referred to as 'stale' if its contents have not been accessed for a period of time that is greater than a pre-defined period of time.

In accordance with various embodiments of the present invention, file system 100 can be a part of network file system (NFS). In particular, file system 100 can be implemented in, but not limited to, an operating system such as UNIX and LINUX.

Figure 2:
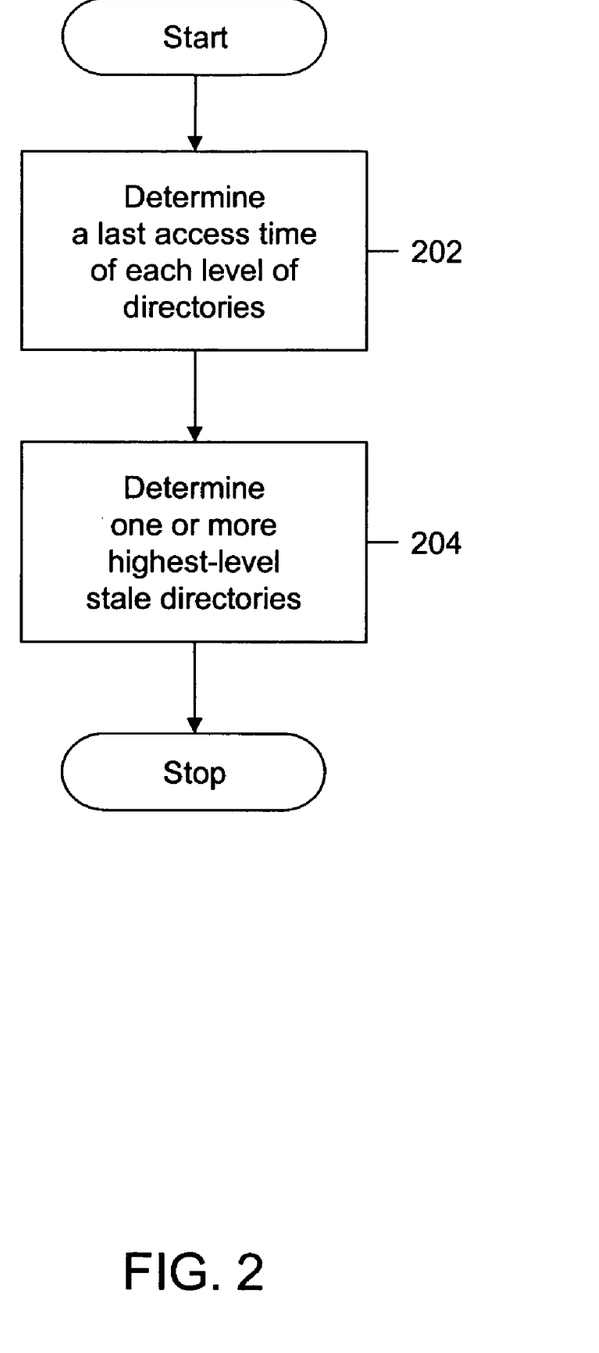
FIG. 2 illustrates a flowchart for identifying stale directories in a file system, in accordance with various embodiments of the present invention.

FIG. 2 illustrates a flowchart for identifying stale directories in a file system, in accordance with various embodiments of the present invention. At act 202, a set of attributes of all the files is used to determine a last access time of each level of directories. Next, at act 204, all the highest-level directories that have not been accessed for a period of time that is greater than a pre-defined period of time are determined.

Referring again to FIG. 1, consider, for example, that a directory 104a and a directory 106c are stale. For directory 104a to be stale, a directory 106a and a file 106b (constituting directory 104a) need to be stale. Further, for directory 106a to be stale, a file 108a and a file 108b (constituting directory 106a) need to be stale. For directory 106c to be stale, a directory 108c and a directory 108d (constituting directory 106c) need to be stale. Further, for directory 108c to be stale, a file 110a and a file 110b (constituting directory 108c) need to be stale. Similarly, for directory 108d to be stale, a file 110c (constituting directory 108d) needs to be stale. It is to be noted that directories 104a and 106c are identified as the highest-level stale directories.

Figure 3A:
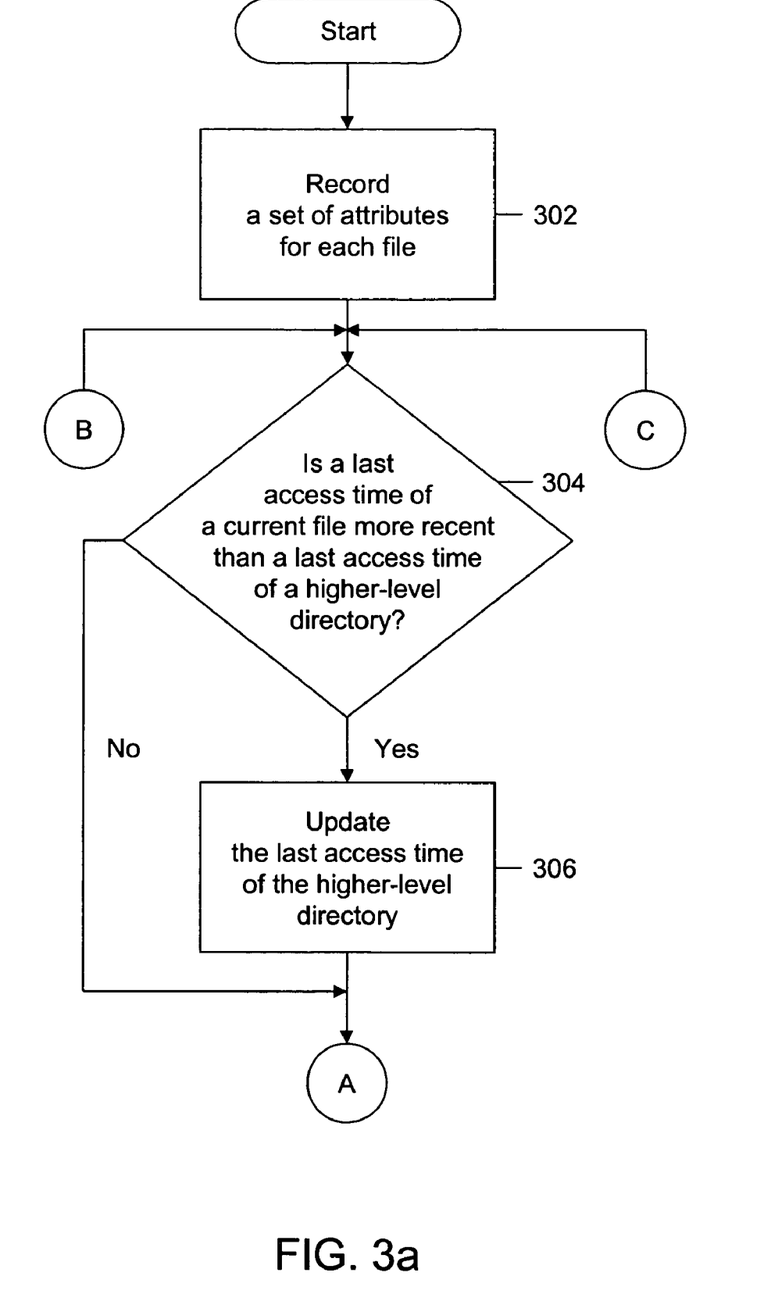
FIGS. 3a and 3b illustrate a flowchart for determining a last access time in each level of directories in the file system, in accordance with various embodiments of the present invention.
Figure 3B:
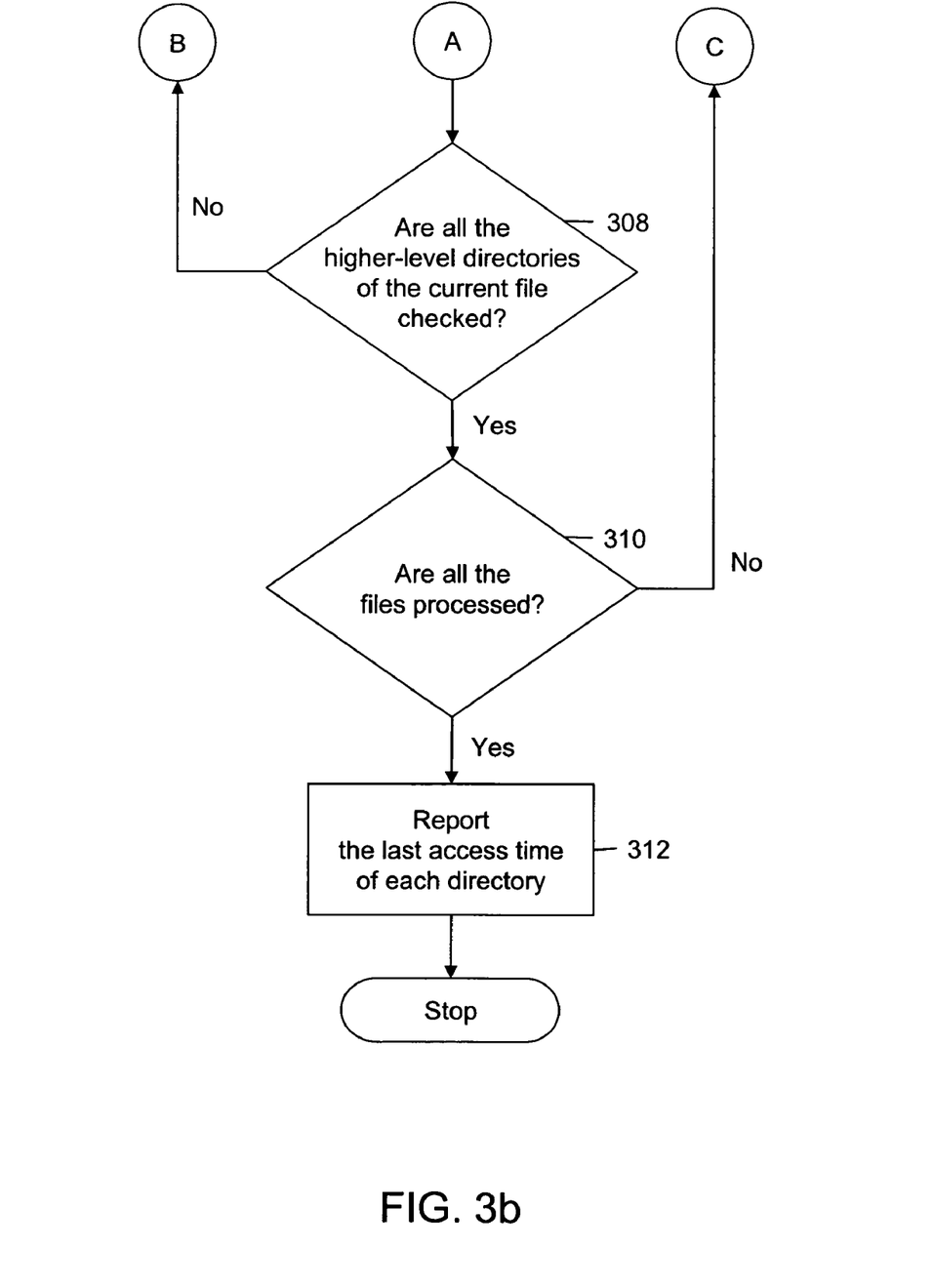

FIGS. 3a and 3b illustrate a flowchart for determining the last access time of each level of directories in the file system (act 202, FIG. 2), in accordance with various embodiments of the present invention. All the files in the file system are scanned and a set of attributes of each file is recorded, in accordance with act 302. The set of attributes of a file includes a last access time of the file and a complete directory path of the file, in accordance with various embodiments of the present invention. The set of attributes of the file may further include, for example, a creation time of the file, user and group ownerships of the file, and the size of the file, in accordance with various embodiments of the present invention. As this can be a time-consuming act, it can be run on multiple machines in parallel, as is well understood in the art.

A recorded set of attributes may be stored in an intermediate file, in accordance with various embodiments of the present invention. The intermediate file may be saved in a compressed form. A compressed file may be decompressed later for further processing.

At act 304, it is checked whether the last access time of a file is more recent than the last access time of a higher-level directory. If the last access time of the file is more recent than the last access time of the higher-level directory, act 306 is performed. In accordance with act 306, the last access time of the higher-level directory is updated with the last access time of the file. If, at act 304, it is found that the last access time of the file is not more recent than the last access time of the higher-level directory, act 306 is left out. When the file has been created recently, the creation time of the file is used as the last access time in the above-mentioned acts 304 and 306.

The last access time is parsed from the intermediate file with the complete directory path of each file in the intermediate file processed from right to left. For each file, the file name is stripped from the complete directory path, to provide the complete directory path of a higher-level directory that includes the file.

The process of stripping the names to provide higher-level directories, and comparing the last access time of the file with that of one or more higher-level directories, is repeated till all the higher-level directories in the complete directory path of the file are examined. Thus, at act 308, it is checked whether the last access time of each higher-level directory that includes the file has been compared with the last access time of the file and updated accordingly. If the last access time of each higher-level directory that includes the file has not been compared with the last access time of the file, acts 304 and 306 are appropriately performed for the remaining higher-level directories of the file.

If, at act 308, it is found that the last access time of each higher-level directory that includes the file has been compared with the last access time of the file, act 310 is performed. At act 310, it is checked whether all the files have been processed. If all the files have not been processed, act 304 is performed again for the unprocessed files. In this way, acts 304-308 are appropriately performed till all the files have been processed.

In an embodiment of the present invention, a set of counters may be maintained and updated for each higher-level directory. The set of counters may include, for example, four counters—one for counting contents last accessed within the previous month, one for counting contents last accessed between one to six months, one for counting contents last accessed between six months to a year, and, finally, one for counting contents last accessed more than a year ago. The counters of a directory are updated in accordance with acts 304-310.

If, at act 310, it is found that all the files have been processed, act 312 is performed. At act 312, a report containing the last access time of the directories at various levels of the file system is generated. In accordance with an embodiment of the present invention, the report may be based on either user ownership or group ownership. In accordance with an embodiment of the present invention, the report may also contain the number and size of the files/directories comprising a directory. In accordance with an embodiment of the present invention, the report may also contain the top-level directories in the file system. Further processing of the report is described in detail in conjunction with FIGS. 4a and 4b.

Figure 4A:
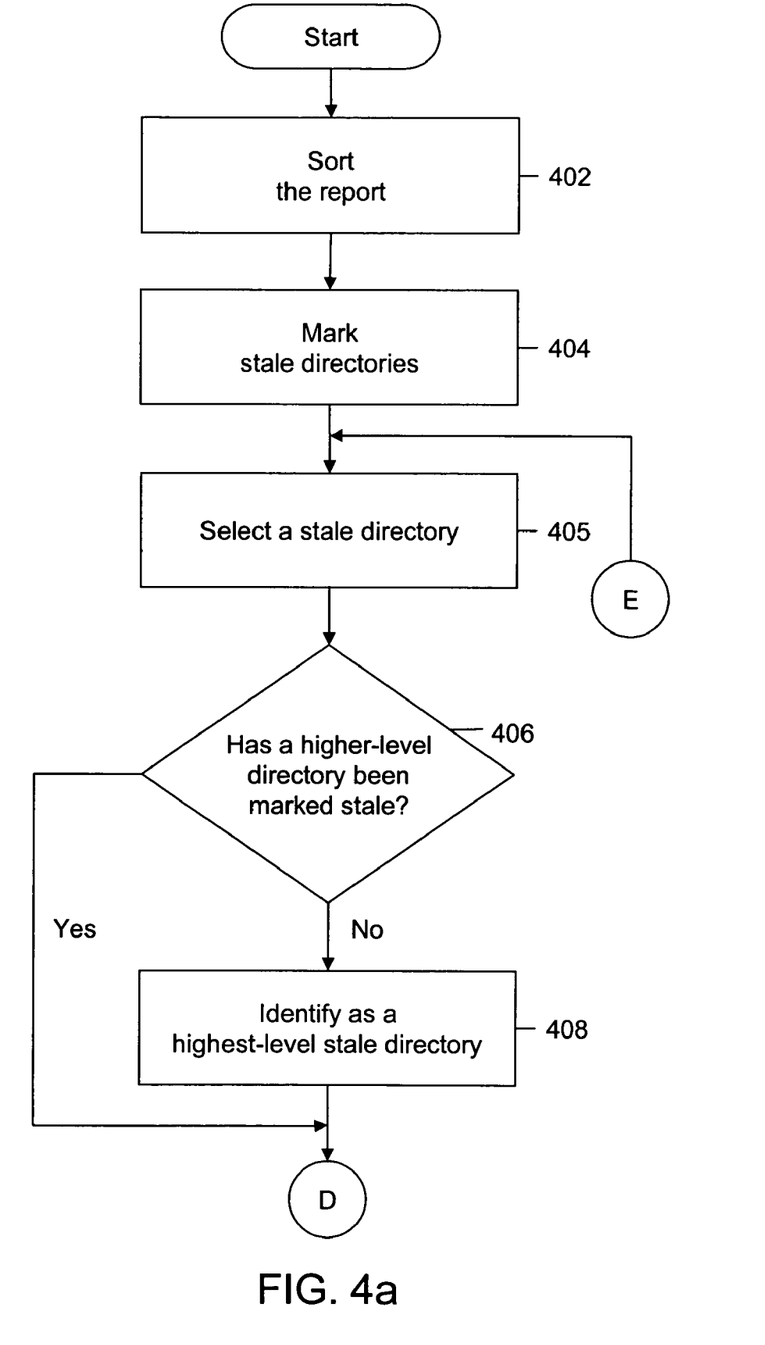
FIGS. 4a and 4b illustrate a flowchart for determining one or more highest-level stale directories in the file system, in accordance with various embodiments of the present invention.
Figure 4B:
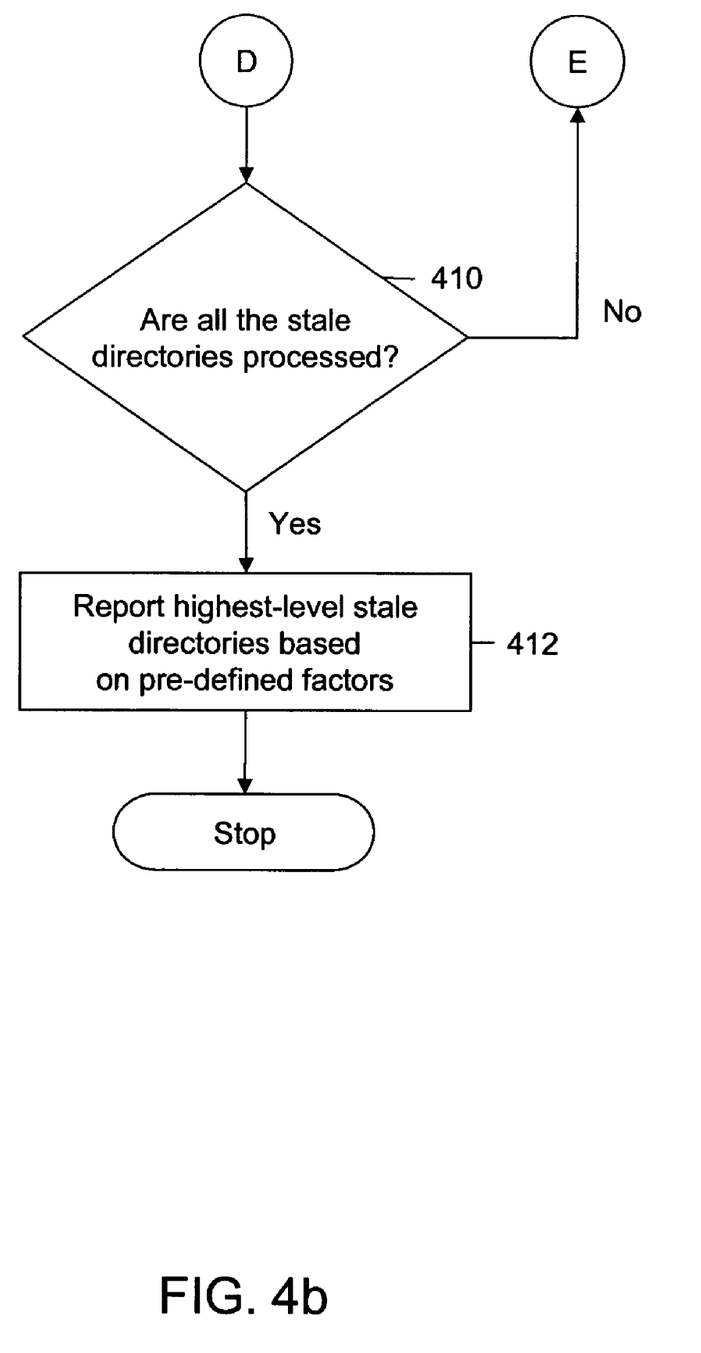

FIGS. 4a and 4b illustrate a flowchart that determines the highest-level stale directories in the file system (act 204, FIG. 2), in accordance with various embodiments of the present invention. In accordance with act 402, the report containing the last access time of all the directories is sorted out. The sorting out may be performed alphabetically on the complete directory paths of directories at various levels in the file system, in accordance with various embodiments of the present invention.

Sorted out directories in the report are then checked, one-by-one, in accordance with act 404. A directory may be marked stale if it has not been accessed for a period of time that is greater than the pre-defined period of time, in accordance with various embodiments of the present invention. For example, a directory may be marked stale if it has not been accessed in the last three months, i.e., the pre-defined period of time is three months. The pre-defined period of time may be user-defined or system-defined, in accordance with various embodiments of the present invention.

A stale directory is selected at act 405, and it is checked whether a higher-level stale directory that includes the stale directory has already been encountered at act 406. If no higher-level stale directory that includes the stale directory has been encountered, the stale directory is identified as a highest-level stale directory at act 408. Otherwise, if a higher-level stale directory of the stale directory has been encountered, act 408 is left out. At act 410, it is checked whether all the stale directories have been processed. If all the stale directories have not been processed, acts 405-408 are appropriately performed for all the unprocessed directories. If, at act 410, it is found that all the stale directories have been processed, act 412 is performed. In accordance with act 412, a report containing the highest-level stale directories, identified by acts 404-410, is generated. In accordance with various embodiments of the present invention, the report may be based on several pre-defined periods of time.

A method described in conjunction with FIGS. 3a, 3b, 4a and 4b is hereinafter described by using an example.

Consider, for example, file 108a in file system 100. The complete directory path of file 108a is assumed as following:

'directory 102/directory 104a/directory 106a/file 108a'.

When file name 108a is stripped, 'directory 102/directory 104a/directory 106a' is obtained, which is the complete directory path of directory 106a, a higher-level directory that includes file 108a. In accordance with acts 304-308, the last access time of each directory in the complete directory path of file 108a is computed. Similarly, the last access time of each directory in the complete directory paths of files 108b, 106b, 110a, 110b, 110c and 108e is computed.

When the report of the last access time of each directory is alphabetically sorted out on the complete directory paths, the following list is obtained:
directory 102
directory 102/directory 104a
directory 102/directory 104a/directory 106a
. . .
. . .

Hence, when directory 104a is identified as stale, and directory 102 is not, directory 104a is identified as the highest-level stale directory. Similarly, when directory 106a is encountered, it is identified that a higher-level directory, directory 104a, has already been identified as stale. Consequently, directory 106a is left out and is not reported as the highest-level stale directory.

Figure 5:
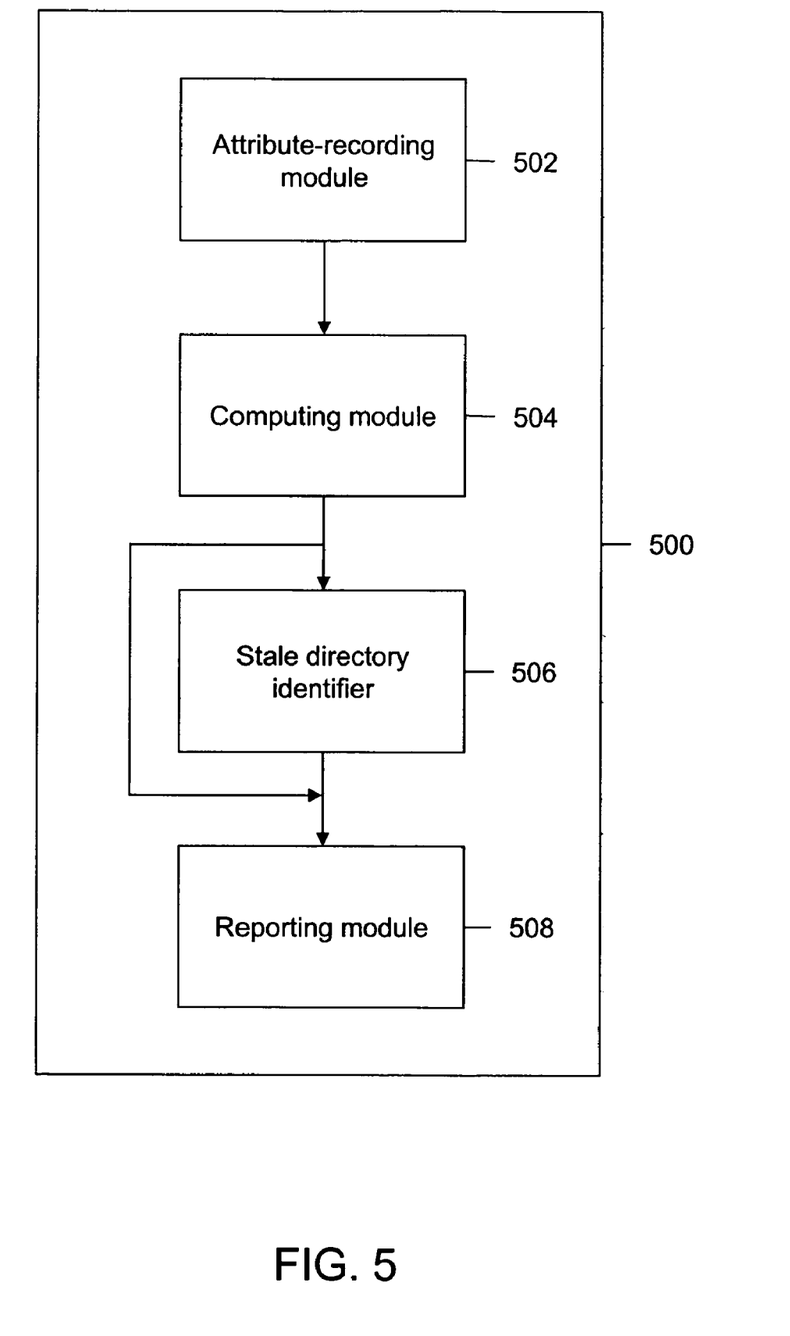
FIG. 5 illustrates a block diagram of various elements of a system for identifying highest-level stale directories, in accordance with various embodiments of the present invention.

FIG. 5 illustrates a block diagram of various elements of a system 500 for identifying highest-level stale directories, in accordance with various embodiments of the present invention. System 500 includes an attribute-recording module 502, a computing module 504, a stale directory identifier 506, and a reporting module 508.

Attribute-recording module 502 is a means for recording the set of attributes of each file in the file system, in accordance with various embodiments of the present invention. In an embodiment of the present invention, attribute-recording module 502 can include a user interface for receiving a list of attributes to be recorded in the set of attributes. A user can define the set of attributes to be recorded, in accordance with an embodiment of the present invention. Attribute-recording module 502 scans all the files in the file system and records the set of attributes of each file. Details pertaining to the method of scanning the files have already been described at act 302.

Computing module 504 utilizes the set of attributes recorded by attribute-recording module 502, for computing the last access time of each directory. In accordance with various embodiments of the present invention, computing module 504 is a means for computing a last access time of each directory in the file system.

Computing module 504 processes the complete directory path of each file, and compares the last access time of each higher-level directory of a file with the last access time of the file. Computing module 504 updates the last access time of the higher-level directory, if the file has a last access time that is more recent than the last access time of the higher-level directory.

When computing module 504 has computed the last access time of each directory in the file system, reporting module 508 generates a report containing information about each directory. In various embodiments of the present invention, computing module 504 performs acts 304-310.

Stale directory identifier 506 is a means for determining one or more highest-level directories that have not been accessed for a period of time that is greater than a pre-defined period of time. Stale directory identifier 506 sorts out the report generated by computing module 504. Stale directory identifier 506 compares the last access time of each directory with the pre-defined period of time. If a directory has not been accessed for a period of time that is greater than the pre-defined period of time, stale directory identifier 506 marks the directory as stale. Next, stale directory identifier 506 checks, if a higher-level directory of the directory has already been marked as stale. If no higher-level directory of the directory had been marked stale, stale directory identifier 506 identifies the directory as a highest-level stale directory. Otherwise, if a higher-level directory of the directory has been marked stale, stale directory identifier 506 leaves out the directory. In various embodiments of the present invention, stale directory identifier 506 performs acts 402-410.

Once the highest-level stale directories have been identified, reporting module 508 generates a report of the highest-level stale directories identified by stale directory identifier 506. The report can also provide information such as the number of files within each highest-level stale directories, the size of each file, and so forth. In accordance with various embodiments of the present invention, reporting module 506 is a means for reporting various details required by the user. In an embodiment of the present invention, reporting module 508 can include a user interface for displaying the report.

Figure 6:
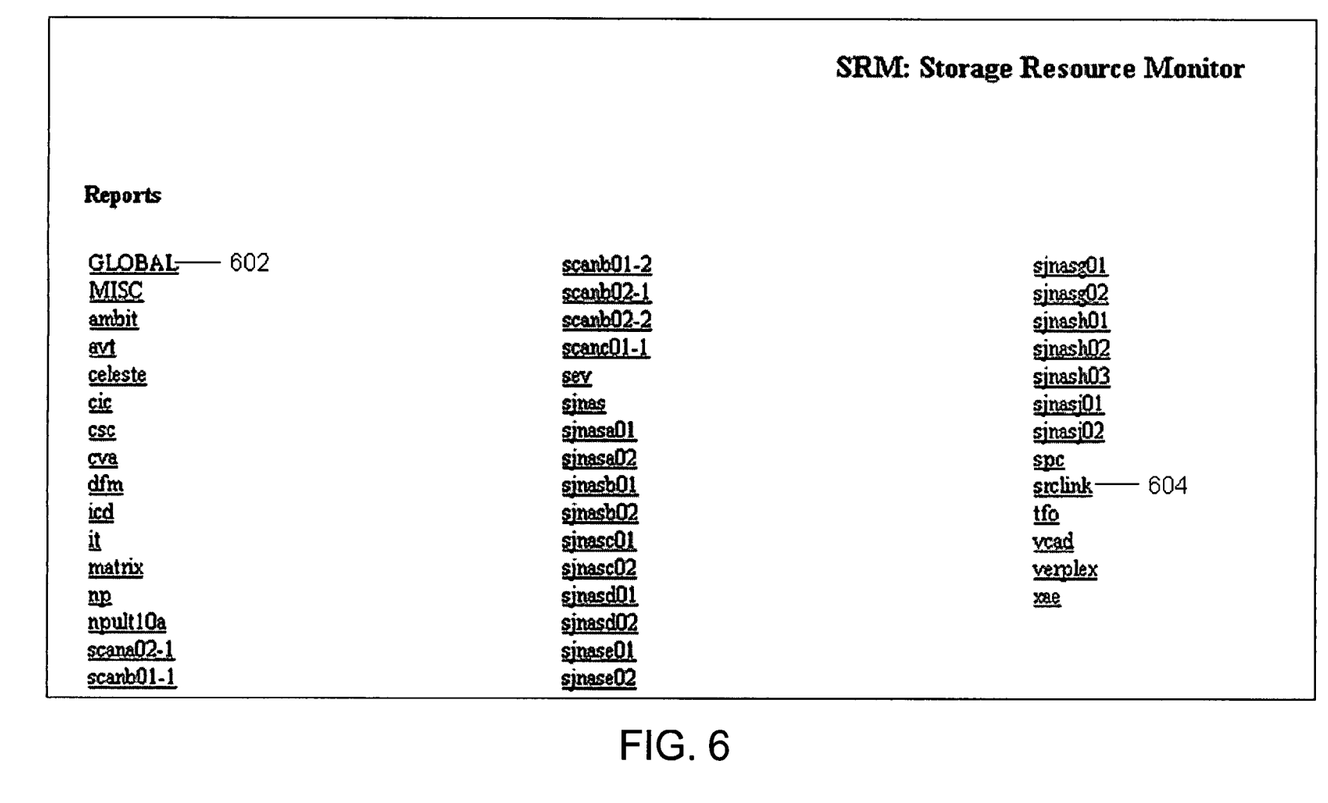
FIG. 6 illustrates a screenshot displaying a list of reports generated by the system, for an example file system in an example user interface, in accordance with various embodiments of the present invention.

FIG. 6 illustrates a screenshot displaying a list of reports generated by system 500, for an example file system in an example user interface, in accordance with various embodiments of the present invention. The user may select a particular report by clicking on a corresponding link. The reports may be based on various groups or storage. A consolidated report of all the reports is also provided, and is displayed as a link 602 titled 'GLOBAL'. An example report, displayed after selecting a link 604 of a group titled 'srclink', is illustrated with reference to FIG. 7.

Figure 7:
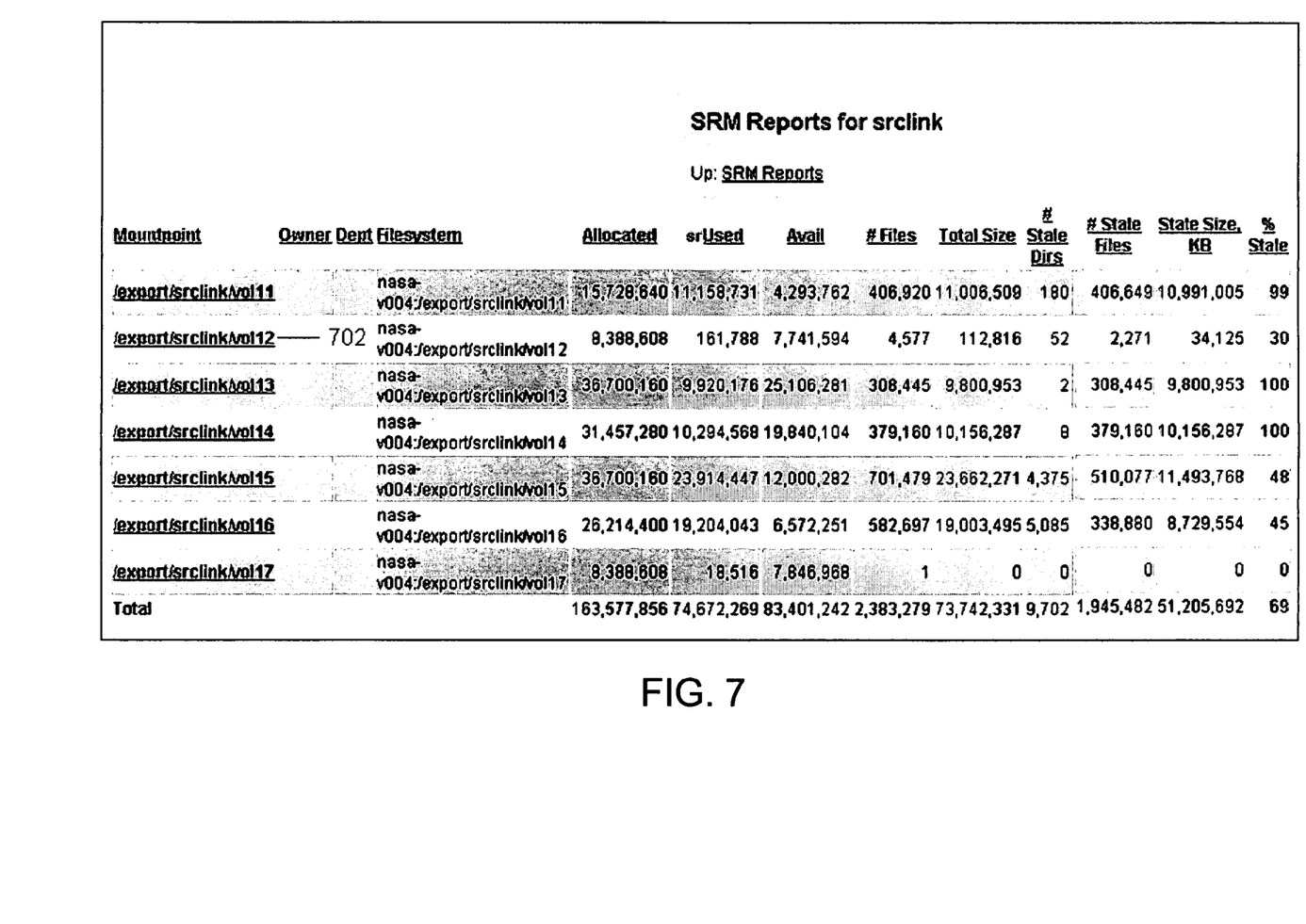
FIG. 7 illustrates a screenshot displaying an example report corresponding to a group, in the example user interface, in accordance with various embodiments of the present invention.

FIG. 7 illustrates a screenshot displaying the example report corresponding to link 604 of the group titled 'srclink', in the example user interface, in accordance with various embodiments of the present invention. The example user interface provides the user an option to sort a column by clicking a header of the column, in an ascending or a descending manner. The user may select a report corresponding to a sub-group by clicking on a corresponding link. An example report, displayed on selecting a link 702 of a sub-group titled 'vol12', is illustrated with reference to FIG. 8.

Figure 8:
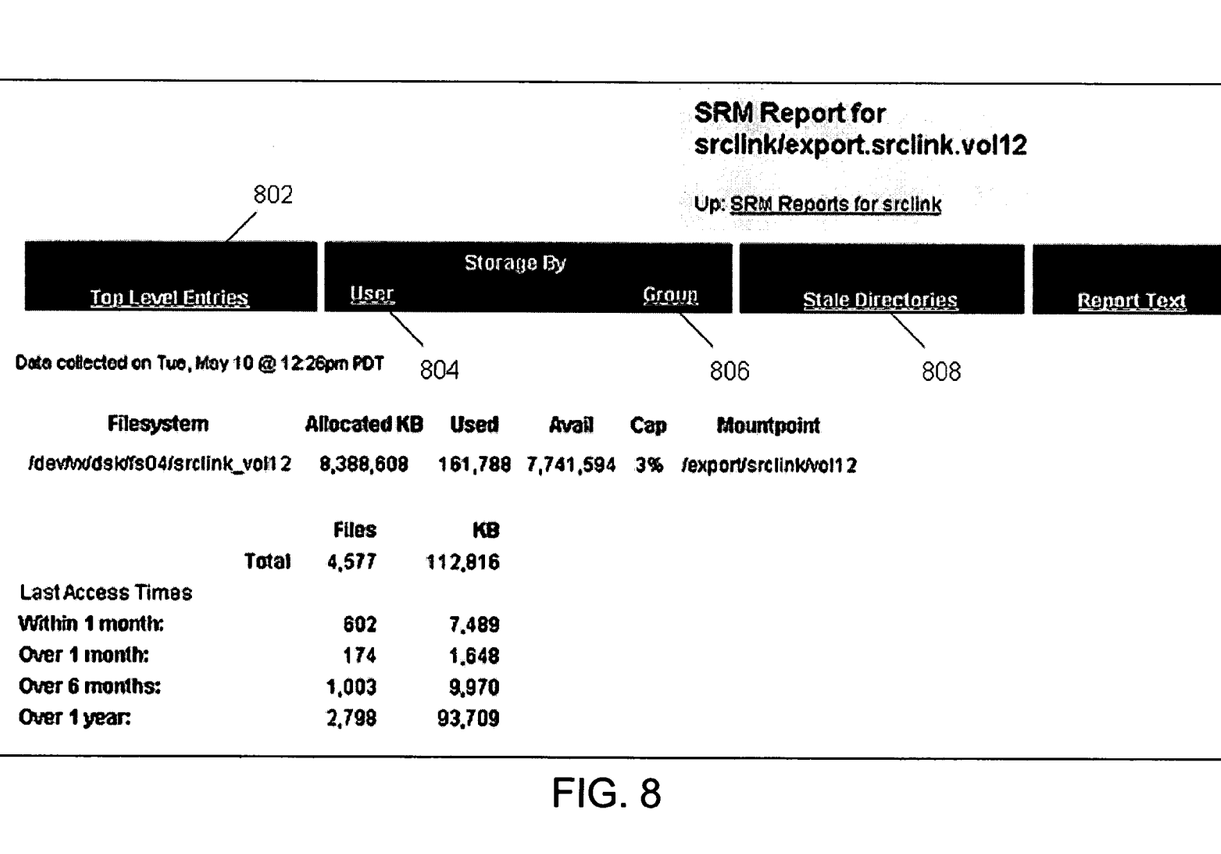
FIG. 8 illustrates a screenshot displaying an example report corresponding to a sub-group in the group, in the example user interface, in accordance with various embodiments of the present invention.

FIG. 8 illustrates a screenshot displaying the example report corresponding to link 702 of the sub-group titled 'vol12', in the example user interface, in accordance with various embodiments of the present invention. The report displays last access times of files, number of the files, and size of the files, in the example file system. Further, the example user interface provides the user various options for other reports, for example, a report of top-level entries displayed as a link 802, a report based on user ownerships displayed as a link 804, a report based on group ownerships displayed as a link 806, and a report of stale directories displayed as a link 808.

Figure 9:
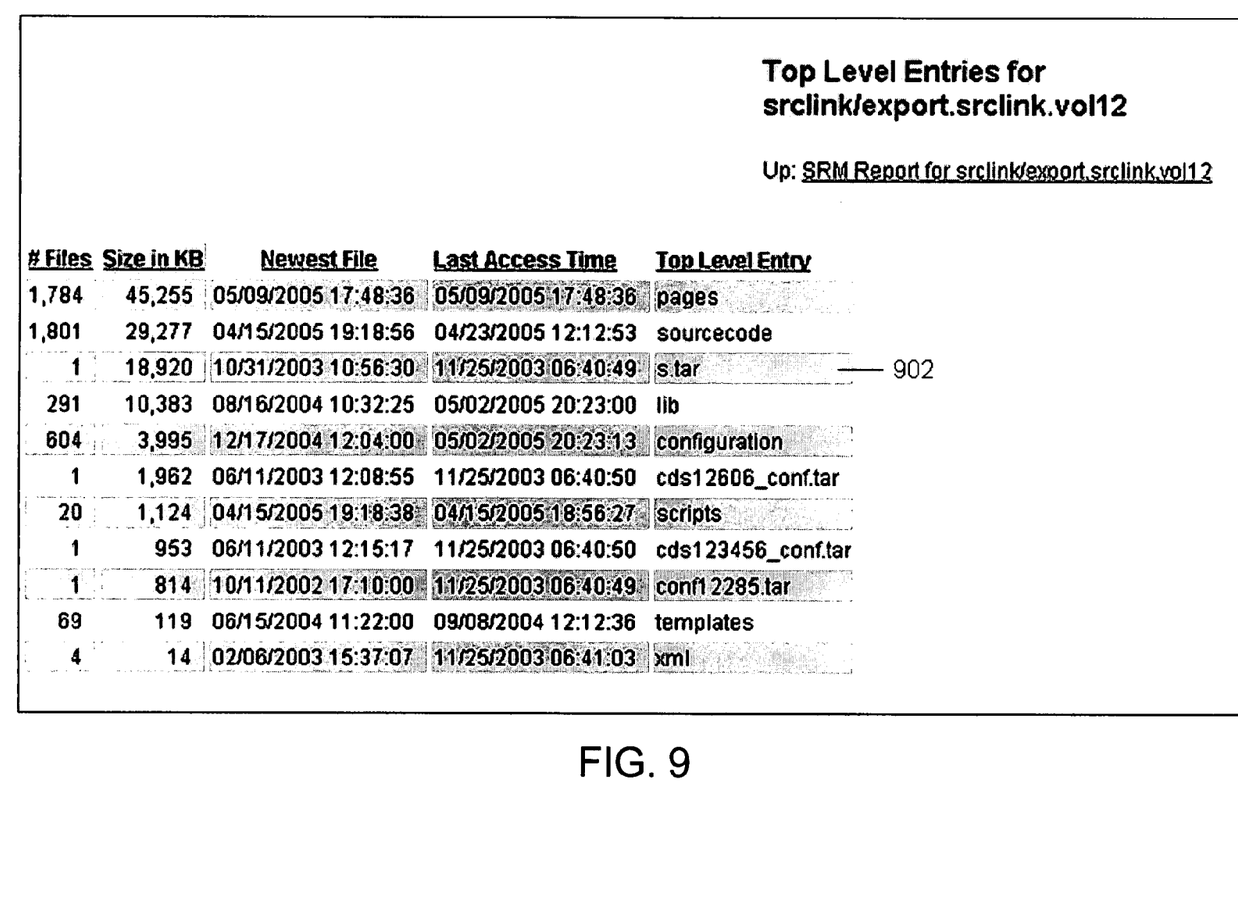
FIG. 9 illustrates a screenshot displaying another report corresponding to the sub-group, in the example user interface, in accordance with various embodiments of the present invention.

FIG. 9 illustrates a screenshot displaying the report of top-level entries corresponding to link 802, in the example user interface, in accordance with various embodiments of the present invention. The report includes all top-level entries in the sub-group titled 'vol12', sorted by size. The top-level entries can include all top-level directories, and all top-level files, in accordance with various embodiments of the present invention. Some of the top-level entries include a single file, for example, a file titled 's.tar' displayed by a list element 902.

Figure 10:
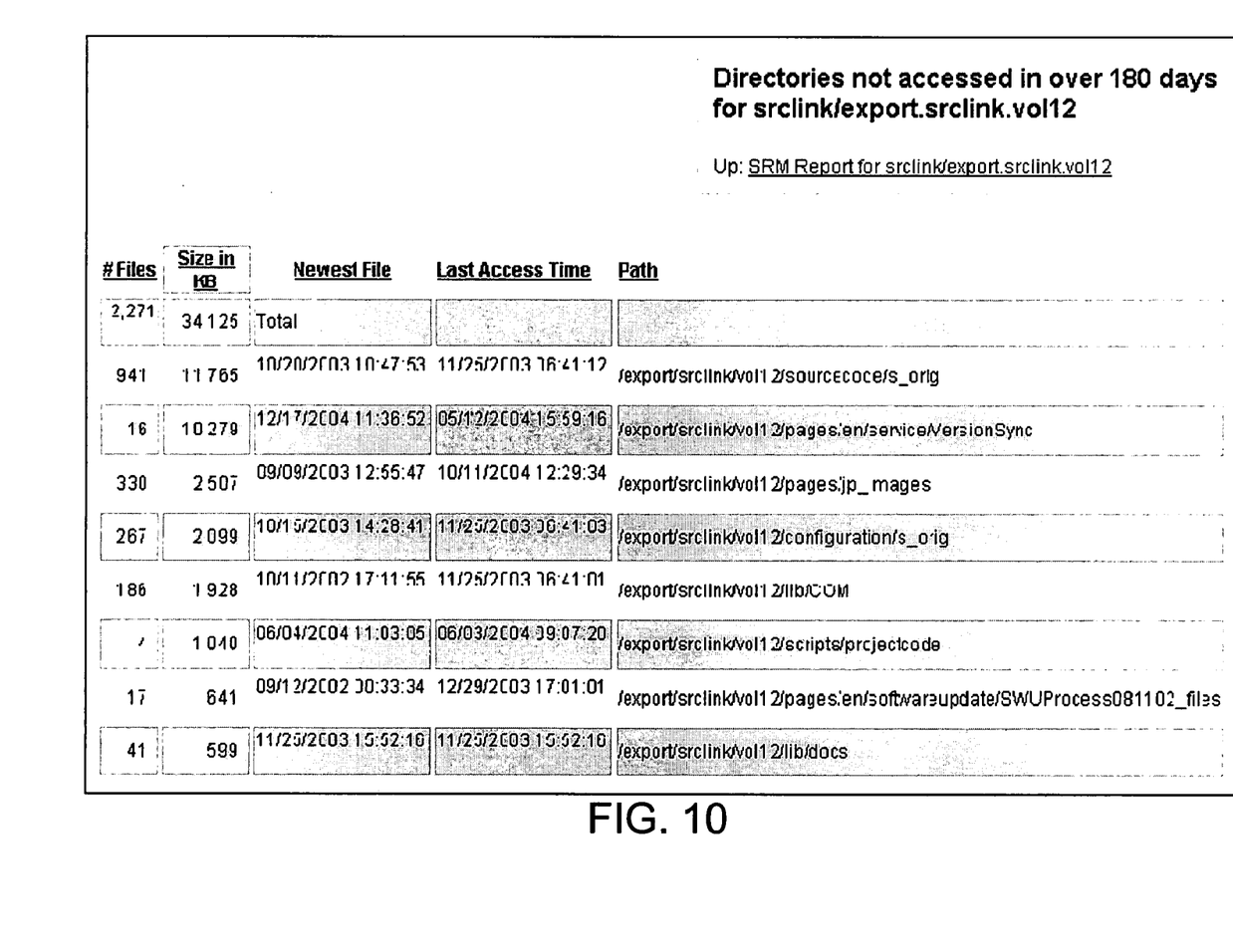
FIG. 10 illustrates a screenshot displaying yet another report corresponding to the sub-group, in the example user interface, in accordance with various embodiments of the present invention.

FIG. 10 illustrates a screenshot displaying the report of stale directories corresponding to link 808, in the example user interface, in accordance with various embodiments of the present invention. The report includes a list of stale directories, sorted by size, for an example embodiment where stale directories are those not accessed in over 180 days.

Figure 11:
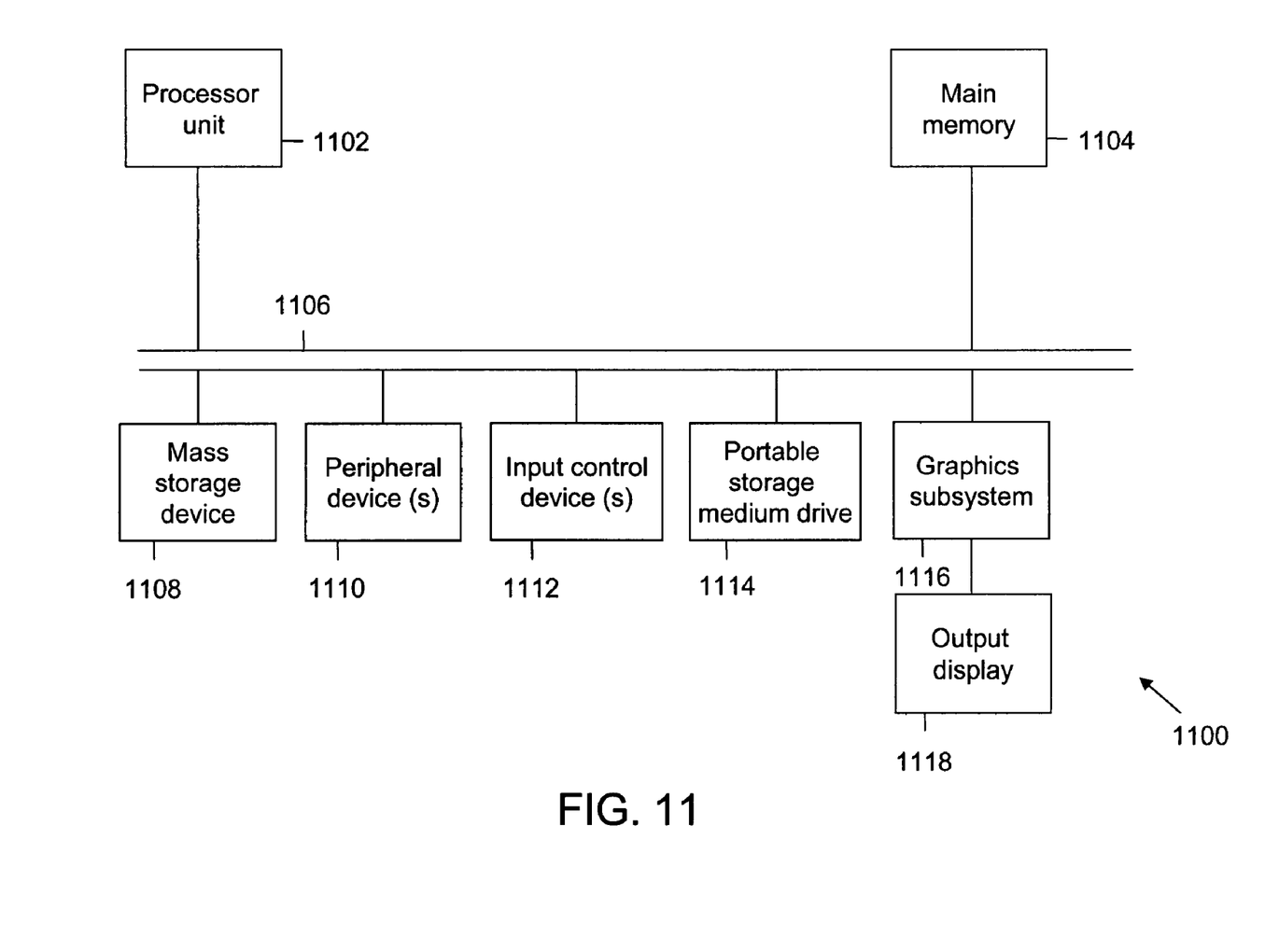
FIG. 11 illustrates a block diagram of a general-purpose computer system of a system for identifying highest-level stale directories, in accordance with various embodiments of the present invention.

In various embodiments of the present invention, each of the system elements of system 500 is implemented in the form of a software module. FIG. 11 illustrates a block diagram of a general-purpose computer system 1100 for executing system 500, in accordance with various embodiments of the present invention.

Computer system 1100 contains a processor unit 1102, a main memory 1104, an interconnect bus 1106, a mass storage device 1108, a peripheral device(s) 1110, an input control device(s) 1112, a portable storage medium drive(s) 1114, a graphics subsystem 1116, and an output display 1118. Processor unit 1102 can include a single microprocessor or a plurality of microprocessors for configuring computer system 1100 as a multi-processor system. Main memory 1104 stores, in part, instructions and data to be executed by processor unit 1102. Main memory 1104 can include banks of dynamic random access memory (DRAM) as well as high-speed cache memory.

For the purpose of simplicity, all the components of computer system 1100 are connected via interconnect bus 1106. However, computer system 1100 may be connected through one or more data transport means. For example, processor unit 1102 and main memory 1104 may be connected via a local microprocessor bus; and mass storage device 1108, peripheral device(s) 1110, portable storage medium drive(s) 1114, and graphics subsystem 1116 may be connected via one or more input/output (I/O) buses. Mass storage device 1108, which can be implemented with a magnetic disk drive or an optical disk drive, is a non-volatile storage device for storing data and instructions, to be used by processor unit 1102. In the software embodiment, mass storage device 1108 stores the software, to load it to main memory 1104.

Portable storage medium drive 1114 operates in conjunction with a portable non-volatile storage medium such as a floppy disk or a compact disc read only memory (CD-ROM), to input and output data and code to and from computer system 1100. In one embodiment, the software is stored on such a portable medium, and is input to computer system 1100 via portable storage medium drive 1114. Peripheral device(s) 1110 can include any type of computer support device such as an input/output (I/O) interface, to add additional functionality to computer system 1100. For example, peripheral device(s) 1110 can include a network interface card, to interface computer system 1100 to a network.

Input control device(s) 1112 provides a portion of the user interface of a user of computer system 1100. Input control device(s) 1112 may include an alphanumeric keypad for inputting alphanumeric and other key information; a cursor control device such as a mouse, a trackball or stylus, or cursor direction keys. In order to display textual and graphical information, computer system 1100 contains graphics subsystem 1116 and output display 1118. Output display 1118 may include a cathode ray tube (CRT) display or liquid crystal display (LCD). Graphics subsystem 1116 receives textual and graphical information, and processes the information for output-to-output display 1118. The components of computer system 1100 are typically found in general-purpose computer systems, and, in fact, these components are intended to represent a broad category of computer components that are well known in the art.

For software implementation, system 500 includes a plurality of computer executable instructions, to be implemented on a general-purpose computer system 1100. Prior to loading it into general-purpose computer system 1100, system 500 may reside as encoded information on a computer-readable medium such as a magnetic floppy disk, a magnetic tape, or a compact disc read only memory (CD-ROM). However, system 500 can be implemented in Network File Systems (NFS). In one hardware implementation, system 500 may comprise a dedicated processor comprising processor instructions for performing the functions described herein. Circuits may also be developed to perform these functions.

In accordance with various embodiments of the present invention, the set of attributes of files in the file system may be used to filter a particular category of files. Further, the particular category of files may be processed to identify stale directories.

A higher-level directory is stale, only if all the directories and files contained in the higher-level directory are stale. Hence, the presence of a single directory that is not stale causes the higher-level directory to be not stale. This may be useful in identifying more recently accessed directories, in accordance with various embodiments of the present invention.

Various embodiments of the present invention provide a method and a system to identify the highest-level stale directories in a file system. Further, utilizing the user's own file system organization helps in archiving or deleting stale directories in a manageable way. Further, categorizing the report, based on user and group ownerships, helps in archiving and deleting directories.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the acts constituting the method of the present invention.

The computer system comprises a computer, an input device, a display unit, the Internet, and a microprocessor. The microprocessor is connected to a communication bus. The computer also comprises a memory, which may include Random Access Memory (RAM) and Read Only Memory (ROM). The computer system also comprises a storage device, which can be a hard disk drive or a removable storage drive such as a floppy disk drive, optical disk drive, and so forth. The storage device can also be other similar means for loading computer programs or other instructions into the computer system.

The computer system executes a set of instructions that are stored in one or more storage elements, in order to process input data. These storage elements may also hold data or other information, as desired, and may also be in the form of an information source or a physical memory element in the processing machine.

The set of instructions may include various commands instructing the processing machine to perform specific tasks such as the acts constituting the method of the present invention. The set of instructions may be in the form of a software program, and the software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to user commands, to results of previous processing, or in response to a request made by another processing machine.

While various embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

What is claimed is:

1. A method for identifying stale directories in a file system, the file system comprising one or more levels of directories, the method comprising:

providing a system, wherein the system includes distinct modules, and wherein the distinct modules include: an attribute recording module, a computing module, a stale-directory identifier module, and a reporting module;

establishing a file system, the file system having a plurality of branches extending from a root, wherein a branch includes the root and a terminal directory, and at least one branch has a plurality of levels of higher-level directories above the terminal directory along the corresponding branch towards the root;

recursively reading an access time from each file in the file system, the access time being a creation time for a non-accessed file, and recording the access time of each recursively read file into an intermediate file, wherein said recording an access time is performed by the attribute recording module;

determining a last access time of each level of directories in the file system according to the recorded access times of the recursively read files contained in a respective level of directories, wherein said determining a last access time is performed by the computing module and comprises:

compares the last access time of the directory with the last access time of a file in the directory;

updating the last access time of the directory, if the file in the directory has a last access time that is more recent than the last access time of the directory; and repeating the comparing and updating for all the files in the directory;

determining as stale the directories that have not been accessed for a period of time that is greater than a pre-defined period of time and determining the highest level stale directory within each branch of the file system by comparing each stale directory with its higher-level directories along the branch, wherein said determining directories is performed by the stale-directory identifier module; and reporting one or more highest-level stale directories that have not been accessed for a period of time, wherein said reporting is performed by the reporting module.

2. The method according to claim 1, wherein the determining the last access time of each level of directories further comprises:

recording a set of attributes of each file in the file system, the set of attributes of a file comprising a last access time of the file; and computing the last access time of each higher-level directory of each file.

3. The method according to claim 2, wherein the set of attributes of the file further comprises one or more of a group comprising a creation time of the file, user and group ownerships of the file, the size of the file, and a complete directory path of the file.

4. The method according to claim 1 further comprising reporting directories in the file system on the basis of at least one of user and group ownerships.

5. The method according to claim 1 further comprising reporting top-level directories in the file system.

6. The method according to claim 1 further comprising reporting directories on a basis of one or more pre-defined periods of time.

7. The method according to claim 1 further comprising reporting at least one of a number and a size of the files.

8. A system for identifying stale directories in a file system, the file system comprising one or more levels of directories, the system comprising:

a processor;

a memory module operatively coupled to said processor;

a file system having a plurality of branches extending from a root, wherein a branch includes the root and a terminal directory, and at least one branch has a plurality of levels of higher-level directories above the terminal directory along the corresponding branch towards the root;

means for recursively reading a set of attributes from each file in the file system, the set of attributes of a file comprising a last access time of the file, the access time being a creation time for non-accessed files, and recording the access time of each recursively read file into an intermediate file;

means for computing a last access time of each directory in the file system based on the recorded access times of the recursively read files contained in a respective level of directories, wherein the means for computing the last access time further:

compares the last access time of the directory with the last access time of a file in the directory;

updates the last access time of the directory, if the file in the directory has a last access time that is more recent than the last access time of the directory; and repeats the comparing and updating for all the files in the directory;

means for determining as stale the directories that have not been accessed for a period of time that is greater than a pre-defined period of time and determining the highest level stale directory within each branch of the file system by comparing each stale directory with its higher-level directories along the branch; and means for reporting one or more highest-level stale directories that have not been accessed for a period of time.

9. The system according to claim 8 further comprising means for reporting the highest-level stale directories that have not been accessed for the period of time that is greater than the pre-defined period of time within each branch of the file system.

10. The system according to claim 8 further comprising means for reporting directories in the file system on the basis of at least one of user and group ownerships.

11. The system according to claim 8 further comprising means for reporting top-level directories in the file system.

12. The system according to claim 8 further comprising means for reporting directories on the basis of one or more pre-defined periods of time.

13. The system according to claim 8 further comprising means for reporting at least one of the number and the size of the files.

14. A computer program product for use with a computer, the computer program product comprising a physical computer usable medium having a computer readable program code embodied therein for identifying stale directories in a file system, the file system comprising one or more levels of directories, the computer readable program code comprising program instructions for:

establishing a file system, the file system having a plurality of branches extending from a root, wherein a branch includes the root and a terminal directory, and at least one branch has a plurality of levels of higher-level directories above the terminal directory along the corresponding branch towards the root;

recursively reading an access time from each file in the file system, the access time being a creation time for non-accessed files and recording the access time of each recursively read file into an intermediate file;

determining a last access time of each level of directories in the file system according to the recorded access times of the recursively read files contained in a respective level of directories, the determination of the last access time comprising:
  comparing the last access time of the directory with the last access time of a file in the directory;
  updating the last access time of the directory, if the file in the directory has a last access time that is more recent than the last access time of the directory; and
  repeating the comparing and updating for all the files in the directory;
determining as stale the directories that have not been accessed for a period of time that is greater than a pre-defined period of time and determining the highest level stale directory within each branch of the file system by comparing each stale directory with its higher-level directories along the branch; and,
reporting one or more highest-level stale directories that have not been accessed for a period of time.

15. The computer product according to claim 14 further comprising program instructions for:
  recording a set of attributes of each file in the file system, the set of attributes of a file comprising a last access time of the file; and
  computing the last access time of each higher-level directory of each file.

16. The computer product according to claim 14 further comprising program instructions for reporting directories in the file system based on at least one of user and group ownerships.

17. The computer product according to claim 14 further comprising program instructions for reporting directories based on one or more pre-defined periods of time.

* * * * *